Nov. 7, 1972  A. O. RADKE ET AL  3,702,179
SLIDE RAIL ASSEMBLY
Filed Nov. 19, 1970
Figure 1
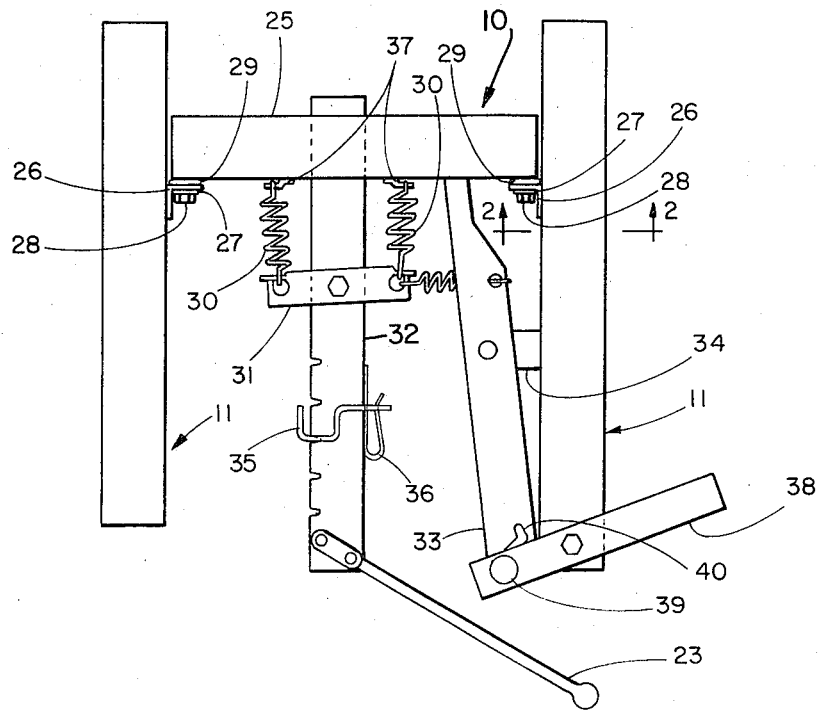
Figure 3
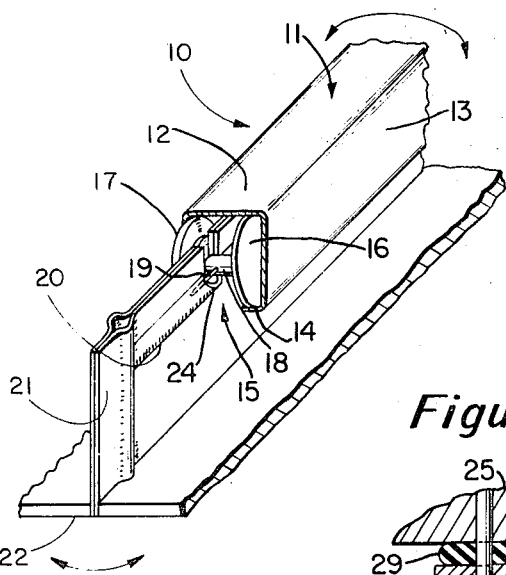
Figure 2
Figure 4
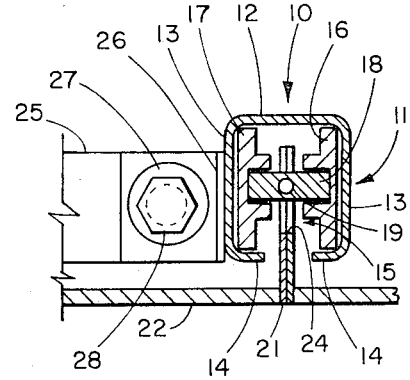
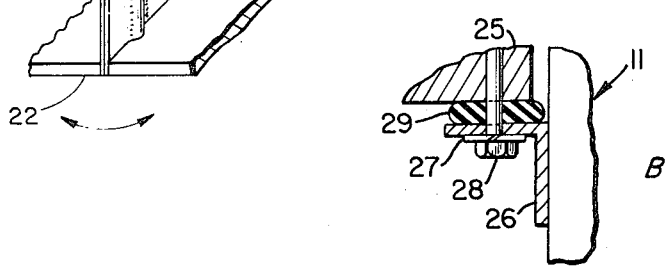
INVENTORS:
Arthur O. Radke
Garth O. Hall
Harvey N. Tengler
BY: James R. Hoatson, Jr.
Philip T. Liggett
ATTORNEYS

United States Patent Office 3,702,179
Patented Nov. 7, 1972

3,702,179
SLIDE RAIL ASSEMBLY
Arthur O. Radke, Milwaukee, and Garth O. Hall and Harvey N. Tengler, New Berlin, Wis., assignors to Universal Oil Products Company, Des Plaines, Ill.
Filed Nov. 19, 1970, Ser. No. 90,970
Int. Cl. F16m 13/00
U.S. Cl. 248—430
5 Claims

ABSTRACT OF THE DISCLOSURE

A track and rollers are engageable and are interposed between two relatively movable members to form a slide rail assembly. Two rollers are joined together by an axle, and a pivot pin passes through the axle and is mounted in a mounting flange that extends outward from one of the two relaitvely movable members parallel to and between the rollers. The pivot pin is thereby aligned with the path of relative motion and the rollers can pivot in a plane that is perpendicular to the direction of relative motion. Twisting of either of the relatively movable members thereby does not cause misalignment of the rollers with the track, and consequent jamming of the slide rail mechanism is prevented.

This invention relates to an improved slide rail assembly. More particularly, a track and rollers are engageable and are interposed between two relatively movable members to form a slide rail assembly. Two rollers are joined by an axle, and a pivot pin passes through the axle and is mounted in a mounting flange that extends outward from one of the two relatively movable members parallel to and between the rollers. The pivot pin is thereby aligned with the path of relative motion and the rollers can pivot in a plane that is perpendicular to the direction of relative motion. Twisting of either of the relatively movable members thereby does not cause misalignment of the rollers and track, and consequent jamming of the slide rail mechanism is prevented. To insure stability of the relatively movable members, a plurality of elements each comprised of rollers joined by an axle and pivoted in a mounting flange are often used to form a slide rail member that interacts with an opposing slide rail member comprised of a single track.

BACKGROUND OF THE INVENTION

Presently, slide rail mechanisms are used in a wide variety of situations in which it is necessary to adjust one relatively movable member along a single path of motion in relation to another member. One illustrative example is the adjustment of a seat part relative to a base part in a vehicle. The fore and aft adjustment in this situation is designed to comfortably accommodate seat occupants of different physical build in a single seat. In this application of the invention, one portion of the slide rail mechanism is fixed relative to the vehicle while the other portion of the slide rail mechanism is fastened to the seat part and moves fore and aft with respect to the first slide rail member.

Conventional slide rail mechanisms may be comprised solely of sliding members, or of rollers engageable in a track. In either form of the existing slide rail assemblies, misalignment of the slide rail members is frequent and consequent jamming of the mechanism often occurs.

SUMMARY OF THE INVENTION

It is an object of the present invention to provide a slide rail mechanism that compensates for misalignment of two relatively movable members. Misalignment of the seat part with respect to the base part in a vehicle seat that is adjustable in a fore and aft direction frequently occurs during installation of the vehicle seat. Because the base part of the vehicle seat assembly must be twisted or stressed to conform to the vehicle frame, the two portions or members of the slide rail mechanism do not properly engage and the seat part frequently becomes locked with respect to the base part. The seat part and base part may also become misaligned after installaion due to various impacts and physical blows to the vehicle seat assembly or due to the movement of the slide rail member on one side of the seat in advance of the slide rail member on the other side of the seat. Such misalignment is a frequent occurence in heavy duty, off the road vehicles.

In a broad aspect this invention is, in a slide rail assembly for adjusting the relative positions of first and second members relatively movable along a single path of motion and having a track attached to said first member and two rollers joined by an axle and engageable with said track attached to said second member, the improvement comprising a mounting flange extending outward from said second member parallel to and between said rollers and having an aperture therein through which said axle passes and said aperture having clearances on both sides of said axle perpendicular to said path of motion and a pivot pin parallel to said path of motion passing through said axle and is mounted in said mounting flange on both sides of said axle.

While the improved slide rail assembly of this invention may be utilized to the advantages described in all situations where conventional slide rail assemblies are currently appropriate, a specific application of this invention is to vehicle seats. One form of this invention is, in a vehicle seat assembly having a base part, a seat part adjustable in a fore and aft direction relative to said base part, a track attached to a first of said seat and base parts, elements each comprised of two rollers joined by an axle and engageable with said track attached to a second of said seat and base parts, the improvement in each element comprising a mounting flange extending outward from the second of said seat and base parts parallel to and between said rollers and having an aperture therein through which said axle passes and said aperture has clearances on both sides of said axle perpendicular to said fore and aft direction, and a pivot pin parallel to said fore and aft direction passes through said axle and is mounted in said mounting flange on both sides of said axle.

BRIEF DESCRIPTION

The features and manner of operation of the present invention are more fully illustrated in the accompanying drawings in which:

FIG. 1 is a plan view of a preferred embodiment of this invention as applied to a vehicle seat.

FIG. 2 is a sectional view taken along the lines 2—2 of FIG. 1.

FIG. 3 is a partially cut away perspective view of the slide rail assembly of FIG. 2.

FIG. 4 is an enlarged partially sectioned view of a portion of FIG. 1.

Referring now to FIG. 1, there is shown a framework 10 comprising a cross member 25 and first slide rail members 11 designed to be rigidly attached to and support a vehicle seat part. The seat part and the framework 10 are adjustable and relatively movable in a fore and aft direction with respect to a base part 22 (FIG. 2). A first slide rail member 11 and a second slide rail member comprised of elements 15 are interposed between the frame 10 and base part 22 in fore and aft alignment so that the two slide rail members are each relatively movable along a single path of motion, that is, in the fore and aft direction. Duplicate slide rail assemblies and slide rail members are positioned on each side of the seat assembly between the framework 10 and base part 22. Each of the first slide rail members 11 is comprised of a track which is attached to the seat part of the vehicle seat assembly. Each of the second slide rail members has fore and aft elements 15 each comprised of two rollers 16 and 17 joined by an axle 18 and having a mounting flange 21 extending outward from the base part 22 parallel to and between the rollers 16 and 17. Each of the mounting flanges 21 has an aperture therein through which the axle 18 passes. The aperture may take the form of an orifice in which the mounting flange 21 encircles the axle 18, but is illustrated in the preferred embodiment as comprising an interstice, that is, an unfilled gap or interval in the mounting flange 21. Whatever the form of the aperture, clearances are provided on both sides of the axle 18 in directions perpendicular to the path of motion. That is, there is a clearance between the axle 18 and the upper edge 24 of the mounting flange 21 and a clearance between the axle 18 and the spine 12 of the first slide rail member 11. A pivot pin 19 extends parallel to the path of motion in the fore and aft direction and passes through the axle 18 and is mounted at receptacles 20 in the mounting flange 21 on both sides of the axle 18, thereby completing each of the elements 15 of the second slide rail member.

Each of the first slide rail members 11 is in the form of a track having two parallel sides 13 exteriorly located with respect to the rollers 16 and 17. A spine 12 connects the parallel sides 13 to each other and to the seat part, which is one of the two relatively movable members between which the slide rail assembly of this invention is interposed. Overhanging lips 14 extend inward from the parallel sides 13 opposite the spine 12, thereby trapping the rollers 16 and 17 within the confines of the track 11.

Each of the tracks 11 is joined together by single or multiple cross members 25. The cross member 25 in the drawings is joined to the tracks 11 at torsionally yieldable connections. The torsionally yieldable connections take the form of bolts 28 bearing against washers 27 and extending through flanges 26 attached to the tracks 11. Interposed between the flanges 26 and the cross member 25 are annular rubber bearings 29. The bolts 28 pass through the bearings 29 and are secured to the cross member 25.

The seat part of the vehicle seat assembly illustrated is adjustably movable with respect to the base part 22 by means of the slide rail members of this invention. Fore and aft adjustment of the seat part is achieved by pulling the lever 23 counterclockwise in FIG. 1. The bias of hairpin spring 36 is thereby overcome and the rack 32 (carrying the framework 10), is disengaged from the upstanding catch 35 that is connected to the base part 22 of the seat assembly. With the counterclockwise pressure maintained on lever 23, the seat part carried by the framework 10 may be moved fore and aft with respect to the base part 22. Release of the lever 23 allows the rack 32 to fix the seat part with respect to the base part in a nominal ride position. Of course, it is to be understood that the coil springs 30 connected to the brackets 37 of the framework 10 will allow oscillations of small amplitude between the slide rail members of this invention in a fore and aft direction in order to compensate for longitudinal vibration and impacts which are transmitted through the vehicle to the vehicle seat assembly. The nominal ride position of the seat part is determined by the position of the crossbar 31 which is attached to the rack 32. While the crossbar 31 is fixed with respect to rack 32, the framework 10 may slide fore and aft along the un-notched end of rack 32. That is, cross member 25 fits slideably around the un-notched end of rack 32. The vibration isolation mechanism formed by the coil springs 30 which act as a connection means between the seat part and the base part may be locked out of the system and the seat part may be connected directly to the base part by pushing clockwise on level 38 in FIG. 1. Lever 28 forces a depending pin 39 upward into the slot 40 in lockout latch 33. This causes the lockout latch 33 to pivot in a clockwise direction about bracket 34 and thereby pull the upper end of rack 32 into rigid engagement with a catch (not visible) depending from cross member 25.

The unique slide rail mechanism of this invention allows the rollers 16 and 17 to travel freely within the tracks 11 of the vehicle seat assembly illustrated during periods of fore and aft adjustment and during periods of fore and aft oscillation of the seat part with respect to the base part. This smooth interaction is achieved even though one or both of the slide rail members are displaced from the positions indicated in the drawings due to torsional forces acting as illustrated by the arrows of FIG. 3. By referring to FIG. 3, it can be seen that a torsional force acting clockwise on the track 11 would normally cause a misalignment of the track 11 with the rollers 16 and 17. However, because of the unique construction of the slide rail mechanism, the pivot pin 19 rotates clockwise within the mountings 20 and allows the axle 18 and the rollers 16 and 17 to turn clockwise with it. The rollers 16 and 17 thereby remain in aligned engagement with the track 11. That is, the rollers 16 and 17 remain parallel to the sides 13 and perpendicular to the lips 14 and spine 12 of the track 11. Thus, a physical blow to the seat part or the framework 10 altering the original alignment of the tracks 11 will not cause misalignment of the slide rail members. Similarly, if the base part 22 is deformed in either a clockwise or a counterclockwise direction as it is installed in the vehicle, the pivot pin 19 will rotate thereby preventing misalignment of the rollers 16 and 17 with the track 11. To insure that the improved slide rail assembly of this invention remains operable, it is only necessary that there be adequate clearances between the axle 18 and the mounting flange 21 in the plane in which the axle 18 turns to compensate for potential misalignment. This plane both contains the axle 18 and is perpendicular to the direction of relative motion. It is also necessary that adequate clearance be provided between the inner flange 21, but must be separated from the mounting flange 21. For this reason, the inner surfaces of the rollers 16 and 17 cannot fit snugly up against the mounting flange 21, but must be separated from the mounting flange 21 by sufficient clearances so that they do not bind against the mounting flange 21 when twisted relative thereto.

In the preferred form of the invention illustrated, the torsionally yieldable connections at rubber bearings 29 between the tracks 11 and cross member 25 provide further insurance against misalignment of the slide rail members due to the torsional forces in FIG. 3 and due to the horizontal torsional forces that result when one of the tracks 11 moves slightly in advance of the other. Without these torsionally yieldable connections, uneven elevation or advancement of the slide rail members on the opposite sides of the seat assembly would necessarily result in the torsional forces described and illustrated by the arrows of FIG. 3 and in torsional forces acting in a horizontal plane. Without the torsionally yieldable connections, the cross member 25 would always be locked in a perpendicular relation relative to the tracks 11 as in the normal alignment of FIGS. 1 and 2. By providing a yieldable connection, however, different vertical elevations or longitudinal advancements of the slide rail assemblies on each side of the seat will not necessarily result in torsional forces being applied to the slide rail members since these torsional forces are subject to compensation by the torsionally yieldable connections at rubber bearings 29. That is, the rubber bearings will yield to torsional forces acting about the axis of bearings 29 and one side of each of the rubber bearings will be compressed by torsional forces acting in a horizontal plane. The result is that the cross member 25 may deviate slightly from the horizontal alignment depicted in FIG. 2 and the alignment normal to tracks 11 depicted in FIG. 1 without disrupting the alignment of the tracks 11. The unique slide rail assembly and the unique torsionally yieldable connections of the preferred embodiment of this invention thereby provide two forms of compensation for torsional forces between the seat part and the base part which would otherwise cause misalignment of the slide rail members.

The foregoing description and illustration of the slide rail assembly of this invention have been given for the purposes of illustration and understanding only, and minor modifications will be obvious to those familiar with slide rail assemblies. For example, a pivot pin 19 could be rigidly connected between the mountings 20 and the axle 18 could be made rotatable about the pivot pin 19. Also, the tracks 11 could be connected to the base part of the embodiment illustrated while the rollers and mounting flanges could be attached to the seat part.

We claim as our invention:

1. In a slide rail assembly for adjusting the relative positions of first and second members relatively along a single path of motion and having a track attached to said first member and two rollers joined by an axle and engageable with said track attached to said second member, the improvement comprising a mounting flange extending outward from said second member parallel to and between said rollers and having an aperture therein through which said axle passes, a pivot pin mounted in said mounting flange on both sides of said aperture and in a direction parallel to said path of motion, said pivot pin passing transversely through said axle so as to pivotally support said axle for rocking movement within said aperture.

2. The slide rail assembly of claim 1 further characterized in that said track has two parallel sides exteriorly located with respect to said rollers, a spine connecting said parallel sides to each other and fastened to said first member, and overhanging lips extending inward from said parallel sides opposite said spine; thereby trapping said rollers within the confines of said track.

3. In a vehicle seat assembly having a base part, a seat part adjustable in a fore and aft direction relative to said base part, a track attached to a first of said seat and base parts, elements each comprised of two rollers joined by an axle and engageable with said track attached to a second of said seat and base parts, the improvement in each element comprising a mounting flange extending outward from the second of said seat and base parts parallel to and between said rollers and having an aperture therein through which said axle passes, a pivot pin mounted in said mounting flange on both sides of said aperture and in a direction parallel to said fore and aft direction.

4. In a vehicle seat assembly having a base part, a seat part adjustable in a fore and aft direction relative to said base part, and first and second slide rail members on each side of said seat and base parts interposed therebetween in fore and aft alignment, the improvement wherein said first slide rail members each comprise a track attached to one of said seat and base parts and each of said second slide rail members has elements each comprised of two rollers joined by an axle and engageable with said track, and a mounting flange extends outward from the other of said seat and base parts parallel to and between said rollers and has an aperture therein through which said axle passes, a pivot pin mounted in said mounting flange on both sides of said aperture and in a direction parallel to said fore and aft direction, and each of the slide rail members attached to said seat part are joined together by a cross member at torsionally yieldable connections, thereby insuring against misalignment of the slide rail members.

5. In a vehicle seat assembly having a base part, a seat part adjustable in a fore and aft direction relative to said base part, and first and second slide rail members on each side of said seat and base parts interposed therebetween in fore and aft alignment and one of said first and second slide rail members comprises a track and the other of said first and second slide rail members has elements each comprising spaced rollers joined by an axle and engagable with said track, said rollers and track being mounted so that said first and second slide rail members can pivot relative to each other about an axis parallel to said fore and aft direction, said first slide rail members being attached to said base part and said second slide rail members being attached to said seat part, said second slide rail members being joined together by a cross member at torsionally yieldable connections, permitting limited oscillation of each of said second slide rail members about an axis through its torsional connection which is parallel to said fore and aft direction, thereby insuring against misalignment of said slide rail members.

References Cited

UNITED STATES PATENTS

| | | | |
|---|---|---|---|
| 1,902,632 | 3/1933 | Flintermann | 248—429 |
| 1,921,828 | 8/1933 | Knape | 312—341 X |
| 1,928,814 | 10/1933 | Flintermann | 248—429 |
| 2,278,101 | 3/1942 | Browne | 248—430 |
| 2,931,156 | 4/1960 | Fulwider | 280—111 X |
| 2,932,342 | 4/1960 | Simons et al. | 248—430 |

WILLIAM H. SCHULTZ, Primary Examiner

U.S. Cl. X.R.

308—3.8